Nov. 25, 1952      P. S. MARTIN      2,619,123

POULTRY FOUNTAIN WATER VALVE

Filed Nov. 7, 1947

Inventor:
Perry S. Martin
By Henry H. Snelling
his Attorney

Patented Nov. 25, 1952

2,619,123

UNITED STATES PATENT OFFICE 2,619,123

POULTRY FOUNTAIN WATER VALVE

Perry S. Martin, Harrisonburg, Va., assignor to Shenandoah Equipment Company, Harrisonburg, Va., a firm composed of Lewis S. Martin and Richard E. Martin Application November 7, 1947, Serial No. 784,549

6 Claims. (Cl. 137—750)

This invention relates to valves and has for its principal object the provision of a feed water valve to supply water to preserve a chosen level in a poultry fountain and having the characteristic that in case the fountain should slip off its support or otherwise be removed, the water will be cut off thus avoiding the flooding of the room as in previous valves.

A further object of the invention is to provide a valve suitable for poultry fountains in which there is but one valve seat and this valve seat is closed at either of the two extremes of movement of the lever on which the poultry fountain is suspended. Still another object of the invention is to provide a valve which can be made at a low cost. A still additional function is to provide a poultry fountain valve in which the feed water pipe is secured to the valve body in such manner that no set screw is required. This feature of the invention is obtained by providing a lock nut which jams on the body of the valve but on breaking the connection by unscrewing the feed pipe from the valve body the entire high pressure portion is removed as a unit, hence there is no need of having an extremely accurate connection.

Figure 1:
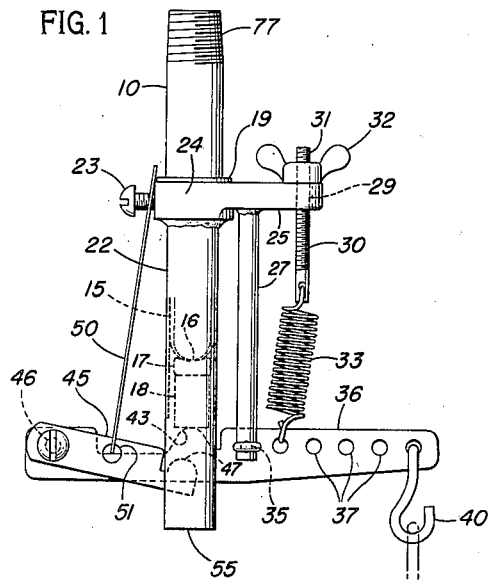
Figure 1 is a side elevation of one form of my device.
Figure 3:
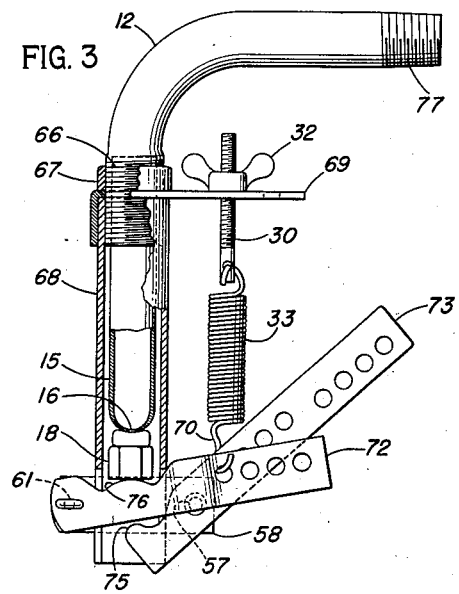
Figure 3 is a similar elevation of a valve employing the jam lock nut.
Figure 5:
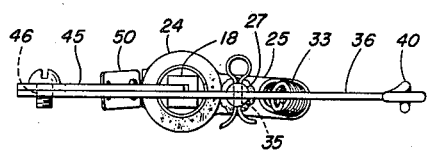
Figure 5 is a bottom plan view of the device of Figure 1.
Figure 4:
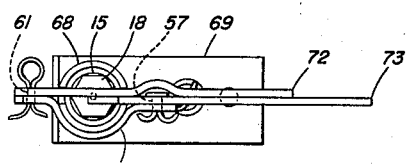
Figure 4 is a bottom plan view of the device of Figure 3.
Figure 2:
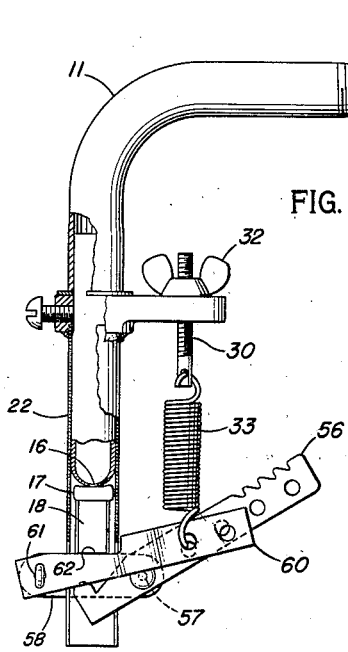
Figure 2 is a side elevation largely in fragmental section of a somewhat altered valve.

In general my device includes a feed water pipe 10 which may either be straight, as shown in Figure 1, or may be of the more common L shape as shown at 11 in Figure 2 and at 12 as shown in Figure 3. The feed water pipe 10 carries a valve tip 15 having a discharge orifice 16 which may be closed by a disk 17 which is urged into position by a metal block or follower 18 preferably square, hexagonal or of some shape other than circular in order that water may freely pass on either side of it.

The valve tip being readily purchaseable in quantity is preferably threaded into the feed water pipe 10 and carries a washer 19 at the shoulder between the feed water pipe and the tip. This is substantially a permanent joint. The assembly of the feed water pipe and tip is received snugly in the valve body 22 and is held in position by a set screw 23 passing through a bracket 24 which has an extending arm 25 to which is permanently secured a post 27. Near the free end of the arm 25 the bracket is pierced as at 29 to receive freely a stem 30 threaded as at 31 to receive a thumb nut 32 whereby to adjust the strength of spring 33 carried at the lower end of stem 30. Pivotally carried as at 35, at the bottom of post 27, is an operating arm or lever 36 having a plurality of holes 37 any of which may receive the spring 33. The hook 40 carries the water trough or drinking pan (not shown).

In the normal use of the device, as the chickens drink water from the trough the spring 33 raises the righthand side of the arm 36 about its pivot 35 and this lowers the cam point 43 which engages block 18. The lowering of this point and the block and with them the disk 17 allows water to flow through the small orifice 16 until the pan contains the chosen amount of water. When the proper amount of water is in the drinking trough, as determined by adjustment of the thumb nut 32 controlling the tension of spring 33, the supply of water will be cut off as the arm 36 moves to elevate disk 17 to close orifice 16.

There are times when it may be desired to shut off the flow of water to the trough as, for example, when it is desired to clean the trough. Extra elements are therefore required and in this form of my invention I pivot an auxiliary lever 45 to the left-hand end of the major operating lever 36 as by the screw 46. The auxiliary lever 45 carries a cam point 47 which normally does not engage the block 18 but when the trough or pan is removed from its hook 40 the spring 33 pulls the right-hand end of the arm or lever 36 upwardly. This lowers the position of the pivot 46 but a thin link 50 loosely pivoted as at 51 to the auxiliary lever 45 and loosely carried by the set screw 23, rocks the auxiliary lever 45 about the mid-pivot 51 and this elevates the cam point 47 until it engages the block 18 and by pressing the disk 17 against the valve tip shuts off the supply of water normally delivered to the pan or trough through the bottom free end 55 of the valve body 22.

Referring now particularly to Figure 2, the main lever 56 is pivoted as at 57 to a curved base 58 soldered or otherwise secured to the valve body 22. This lever 56 operates as does the arm 36 in Figure 1 but in this modification the auxiliary lever, which is numbered 60, is pivoted as at 61 to the base 58. This pivot consequently does not move up and down but in this case the end of spring 33 is hooked through a hole in each of the two levers and therefore pulls both levers upwardly about their respective pivots. In the normal position when water is being fed to the trough in small quantities as it is withdrawn from the trough the main lever 56 is roughly horizontal and of course the auxiliary lever 60 is well out of contact with the block or follower 18 which holds the disk 17 against the discharge orifice 16, but when the trough is removed from the lever 56 the spring 33 pulls both levers up and since the point of lever 56 is far spaced from the follower or block the contact point 62 of the auxiliary lever closes the valve.

The device of Figure 3 performs the same functions as do the other devices the principal difference being that the supply or feed pipe 12 is threaded exteriorly as at 66 and receives a lock nut 67 which when once adjusted is fairly permanently secured in place in any preferred manner. This lock nut may in an emergency be readjusted. Its purpose is to secure the supply pipe in accurate relation to the valve body (which in this case is 68) in order that the discharge orifice 16 may be in proper position and it also has the function of securing the shelf or bracket 69 to the valve body 68 thus avoiding the use of solder or other securing means. At times it is more convenient to secure the shelf 69 to the body 68 permanently in which case solder or other means may be used.

The spring 33, the stem 30 and the thumb nut 32 are the same in this form as in the other forms and as in the device of Figure 2 the lower end 70 of the spring engages in any one of the holes in either the auxiliary lever 72 or the main lever 73. The base is given the numeral 58 as it is identical with the similar member in Figure 2 and like it has a pivoting means 61 on one side and a pivot 57 on the other side. As in the previous forms the main lever 73 is very roughly horizontal when the device is in normal use but when the trough or water pan is removed the spring 33 pulls up both of the levers turning the main lever 73 about its pivot 57 until the point 75 is far out of contact with the follower 18. The pivot 61 being much further away raises the cam point 76 of the auxiliary lever and thus closes effectively the discharge orifice until such time as the main lever 73 is drawn down by the weight of the trough.

In installing any of these devices the valve body is secured to the water supply line which always carries the valve tip 15. The entire assembly is furnished as a unit so that all that is necessary to do is to connect the existing supply line to the feed pipe.

When the device, as shown in any of the figures, is secured to the existing water system, as for example, by means of the threads 77 at the free end of either the L or the straight feed pipe, the device may be adjusted without first attaching the water pan. The thumb nut 32 is turned until the tension of the spring is just sufficient to hold the point 76 of the auxiliary lever 72 in position to close the flow of water. The pan is now attached to the hook 40 and the weight of pan when empty is sufficient to move the right-hand end of the main lever 73 downward a sufficient amount to free the cam point 76 of the auxiliary lever from the follower 18. Water consequently flows and continues to flow until the main lever is turned about pivot 57 a sufficient amount so that its tip or cam point 75 lifts the follower 18 and with it the disk 17 again closing the supply of water. If the total quantity of water flowing into the trough with this setting is not sufficient, this can readily be corrected by tightening the tension on spring 33. Should the amount of water in the pan be insufficient this may be readily corrected by moving the hooked end of spring 33 to a hole nearer the pivots of the two levers or by moving the hook which supports the drinking pan to a hole further from the pivot on the main lever.

What I claim is:

1. A valve comprising a body having a main channel, a water discharge port within the channel, and an exit below the port; a main lever having a free end, an operating cam within the body, and being pivoted at one side of the channel; an auxiliary lever having an operating cam within the body and being pivoted at the opposite side of the channel, a port closure loosely mounted within the channel, and means including an adjustable spring anchored at one end and at the other end engaging the main lever between its free end and its pivot to urge the operating cam of the main lever away from the port closure and engaging the auxiliary lever on the side of the channel opposite the pivot of the auxiliary lever to urge the operating cam of the auxiliary lever into contact with the port closure to close the port, and means at the free end of the main lever adapted to hold a variable weighting means to overcome the spring to move the auxiliary lever out of contact with the port closure and to move the main lever into port closure engaging position, said operating cam of the auxiliary lever engaging the port closure between the pivot of the auxiliary lever and the point of engagement of the auxiliary lever and the spring.

2. The device of claim 1 in which the valve body includes a cylindrical tube, a bracket to which the spring is anchored, and a base which extends on both sides of the tube to support the pivots of the two levers.

3. The device of claim 1 in which the valve body includes a tube having a diametrical slot, both levers move in the slot, and the tube carries a bracket in which the spring is anchored.

4. In combination, a valve body, a bracket secured thereto, a feed water assembly consisting of a feed pipe and a valve seat tip secured thereto and having threaded engagement with the bracket, a spring tension screw engaging the bracket, a pivot stud extending from the valve body on each of two opposite sides thereof, a closure element movable into engagement with the valve tip to shut off water passing through the feed pipe and valve tip, a main lever movable about one of said pivots and having a portion within the valve body for engaging the closure element when the main lever is in approximately horizontal position, a spring connected to the main lever and to the adjusting screw normally holding the free end of the main lever elevated but yielding when the main lever is rotated downwardly to a horizontal position, an auxiliary lever movable about the other pivot stud and connected to said spring, a member on the auxiliary lever for engaging the closure element when the main lever is held in elevated position and movable away from the closure element when the main lever is roughly in horizontal position whereby when the main lever is roughly horizontal, the main lever alone will control admission of water through the bottom of the valve body but when the main lever is in its elevated position the auxiliary lever will shut off water by moving the closure element against the valve tip.

5. In a poultry fountain water valve, a valve body, a feed water assembly having a threaded engagement with the valve body, said assembly consisting of a feed water pipe, a valve seat tip having a small orifice at its closed end and threaded at its upper end into the feed pipe, a nut having threaded engagement with the feed water pipe whereby the feed water assembly can be connected to the pipe quickly by screwing the assembly onto the pipe until the nut is firmly seated, a pair of pivots extending on opposite sides of the valve body, a main lever carrying a closure element and movable about one of said pivots to a position to engage the closure element with the valve tip to shut off the flow of water, an auxiliary lever movable about the other pivot and movable to a position to seat the closure element, a spring engaging both of the levers outwardly of the two pivots and tending to elevate the free ends of the levers whereby as the free ends of the two levers move downwardly, the auxiliary lever will first release the closure element and as the two levers move further and extend the spring to a greater degree, the main lever alone will engage the closure element and control the supply of water through the valve body.

6. In a fountain, a feed water pipe having a tip with a small discharge opening therethru, a closure element, a pivoted main lever having a cam portion engaging the closure element to move the closure element against the opening to shut off water passing thru the feed water pipe, a valve body surrounding the tip, the closure element, and the cam portion of the main lever, a spring engaging the main lever at a point on the opposite side of the pivot from the cam to move the cam portion out of closure engaging position, a pivoted auxiliary lever engaged by the spring and having a cam between its pivot and the point of engagement with the spring to engage the closure element when the cam portion of the main lever is out of engagement with the closure element, and the pivots of the two levers lying on diametrically opposite sides of the path of the closure element, whereby the cam of the auxiliary lever is moved out of closure element engaging position whenever the main lever is moved to overcome the tension of the spring, as when a variable weight is suspended on the main lever, and the auxiliary lever closes flow thru the opening when the weight is removed.

PERRY S. MARTIN.

REFERENCES CITED

The following references are of record in the file of this patent:

UNITED STATES PATENTS

| Number | Name | Date |
| --- | --- | --- |
| 1,415,178 | Imschweiler | May 9, 1922 |
| 1,653,525 | White | Dec. 20, 1927 |
| 1,753,122 | Kielsmeier | Apr. 1, 1930 |
| 2,043,477 | Imschweiler | June 9, 1936 |
| 2,270,910 | Scirsky | Jan. 27, 1942 |
| 2,290,145 | Owens | July 14, 1942 |